(12) United States Patent
Tillman et al.

(10) Patent No.: US 9,751,451 B1
(45) Date of Patent: Sep. 5, 2017

(54) PROTECTIVE DEVICE USEFUL IN TRANSPORTING AND LIFTING OBJECTS HAVING EASILY DAMAGED SURFACES, INCLUDING DELICATE, COATED, PAINTED, AND POLISHED SURFACES

(71) Applicant: The PaintSmiths, Inc. of Springfield, Nevada, MO (US)

(72) Inventors: William L. Tillman, Nevada, MO (US); Kevin W. Tillman, Coweta, OK (US)

(73) Assignee: The Paintsmiths, Inc of Springfield, Nevada, MO (US)

( * ) Notice: Subject to any disclaimer, the term of this patent is extended or adjusted under 35 U.S.C. 154(b) by 0 days.

(21) Appl. No.: 15/189,570

(22) Filed: Jun. 22, 2016

Related U.S. Application Data

(60) Provisional application No. 62/183,049, filed on Jun. 22, 2015.

(51) Int. Cl.
*A45F 5/00* (2006.01)
*B60P 7/08* (2006.01)
*B66C 1/18* (2006.01)
*B66C 1/12* (2006.01)

(52) U.S. Cl.
CPC .............. *B60P 7/0869* (2013.01); *B66C 1/122* (2013.01); *B66C 1/18* (2013.01)

(58) Field of Classification Search
CPC .. A47J 45/077; A45F 5/10; B66C 1/18; B66C 1/122; B60P 7/0869
USPC ....................... 294/31.2, 137, 142
See application file for complete search history.

(56) References Cited

U.S. PATENT DOCUMENTS

| | | | | |
|---|---|---|---|---|
| 4,754,996 A | * | 7/1988 | Tecca | F17C 13/084 294/151 |
| 4,804,218 A | * | 2/1989 | Hilliard | B63C 11/22 294/157 |
| 5,549,339 A | * | 8/1996 | Frean | B65G 7/12 294/164 |
| 6,065,781 A | * | 5/2000 | Titus | B29C 65/505 285/288.1 |
| 6,840,556 B1 | * | 1/2005 | Catlett | B65G 7/12 294/16 |

* cited by examiner

*Primary Examiner* — Stephen Vu
(74) *Attorney, Agent, or Firm* — GableGotwals

(57) ABSTRACT

A protective device in the form of a strap including an outermost layer having a first rigidity and a first coefficient of friction, the first coefficient of friction selected to permit a rigging line to self-center between two points when the rigging line is in contact with the outer layer and under tension and an innermost layer having a second, different lower rigidity and a second different coefficient of friction, the second different coefficient of friction selected to prevent movement of the protective device relative to an object as the rigging line self-centers. The protective device prevents damage to the coated surface, including but not limited to telegraphing of the strap onto the coated surface.

13 Claims, 4 Drawing Sheets

PROTECTIVE DEVICE USEFUL IN TRANSPORTING AND LIFTING OBJECTS HAVING EASILY DAMAGED SURFACES, INCLUDING DELICATE, COATED, PAINTED, AND POLISHED SURFACES

CROSS-REFERENCE TO PENDING APPLICATIONS

This application claims priority to U.S. Prov. Pat. Appl. Ser. No. 62/183,049, filed Jun. 22, 2015.

BACKGROUND OF THE INVENTION

This invention relates generally to devices which protect damage to objects during transport and lifting and, more specifically, to devices which protect damage to coatings applied to the surfaces of objects and which protect polished aluminum, stainless steel, or other materials that would have to be re-polished if damaged to renew an acceptable finish.

Many objects have delicate or easily damaged surfaces, including but not limited to protective or decorative surfaces, and handling and transporting those objects in many cases leads to some degree of damage to the surface. A worst case example is the surfaces of objects such as fuel cylinders, tanks or vessels ("vessels") painted or coated with high temperature coatings. The high temperature coatings are "soft" until fully cured with heat-induced cross-linking and many having a pencil hardness of 4B or softer. Additionally, the high temperature coatings are thermoplastic, meaning they can soften when exposed to heat, including direct sunlight. To make matters worse, in many cases the vessel must be transported or lifted when the coating is in a dry but uncured state. In the case of high temperature coatings, when the vessel arrives at the customer, the entire vessel (or significant areas of it) must be stripped and recoated to meet the specification and provide adequate corrosion control and an aesthetically pleasing finish.

Cargo straps, the most common means used to secure loads on flat bed trailers, are typically made of woven nylon (textured) material that stretches until tightened and secured. A 4-inch wide cargo strap may only have a 1-inch wide contact area, located at the peak of the strap's texture and putting the entire force when secured in a much smaller area. During tightening and after the strap is secured, the strap tries to (and will under tension) "self-center" between the two tie-down points, thereby relative to the coated surface and causing damage and the texture "telegraphs" itself to the surface (see FIG. 1). This kind of damage can occur to coated surfaces even after curing.

To date, no effective solution exists which protects the coating. Manufacturers and customers simply accept damage to coatings as "the way it is," that delicate or painted surfaces will encounter unsightly damage when lifted or secured for transportation and must undergo costly repairs to have an aesthetically pleasing finish.

Not transporting or lifting the vessel until the coating is fully cured is not practical because vessel manufacturers are under pressure to deliver on time and often do not have the luxury of time. And many coatings, especially liquid coatings, require weeks or even a month to fully cure. even if fully cured the coating is prone to damage as the strap's texture bites into the coating or the strap self-centers. Placing padding such as foam, carpet, plastic and rubber bumpers between the cargo strap and the coating has been tried but it also does not work. The strap's contact area is still concentrated over a small area of the padding, the coating itself is not smooth, additional tightening is now required to accommodate the padding yet secure the object, and the strap still self-centers, as well as stretches, but now moves the padding with it.

Similarly, other objects with delicate or easily damaged surfaces such as those having painted surfaces, polished aluminum or stainless steel finishes, or hard protective or decorative surfaces can be damaged in much the same way as objects with high temperature coatings. The heavier the object the more difficult it is to protect it from damage during transport. Therefore, a need exists for a practical, effective solution.

SUMMARY OF THE INVENTION

A preferred embodiment of a protective device made according to this invention includes at least two layers, with the first (outer) layer having a greater rigidity than the second (inner) layer (and not as easily compressed under load) and a coefficient of friction that permits self-centering of a rigging line between two tie-down or lift points when being tightened about the device or used to lift an object protected by the device so the rigging line can self-center relative to the tie-down or lift points. The inner layer has a coefficient of friction different than that of the outer layer and prevents longitudinal or lateral movement of the device when the rigging line is being tightened (or is tight) and when the object is being transported or lifted by the line.

Preferably, the outer and inner layer are different materials rather than the same material fabricated or arranged to exhibit different coefficients of frictions from one another. For example, the outer layer can be a rigid or semi-rigid, flexible material and the inner layer can be a semi-soft, flexible material optionally infused or coated with a non-stick substance. This semi-soft flexible material could also be added to cover the all or a portion of the outer layer to allow for stacking of dry or delicate objects without damage. Alternatively, the inner layer may have non-stick material added to prevent issues associated with "blocking." The width of the outermost layer accommodates the width and lateral movement of the rigging line during self-centering and is preferably narrower than that of the innermost layer.

Objectives of this invention include but are not limited to providing a protective device that: (1) eliminates the need for padding to be placed between a rigging line and an object's surface to prevent damage to the surface; (2) can be used during lifting or transport of an object having a delicate, easily damaged, protective, or decorative surface without damaging the surface; (3) allows a rigging line to self-center without damaging the surface of the object being secured, transported or lifted; (4) distributes the load of the rigging line in such a way that damage to the surface is prevented; (5) does not telegraph the rigging line to the surface; (6) can be reused; (7) can be used when a coating is in a dry-to-touch state but not yet in a dry-to-handle state yet not damage the coating; (8) can be easily stowed in roll form and cut-to-length as needed; (9) is easily handled by a truck driver, material handler or rigger; and (10) can be successfully applied to any object having a delicate or easily damaged surface, including but not limited to items as large as 100 ton (about 90.7 metric tons) industrial pieces of painted equipment to consumer items such as refrigerators, freezers, ovens, and washers and dryers.

ELEMENTS USED IN THE DRAWINGS AND DETAILED DESCRIPTION

Figure 1:
FIG. 1 is a photograph of a coated cylinder whose coating illustrates the kind of damage caused by a cargo strap during transportation.
Figure 4:
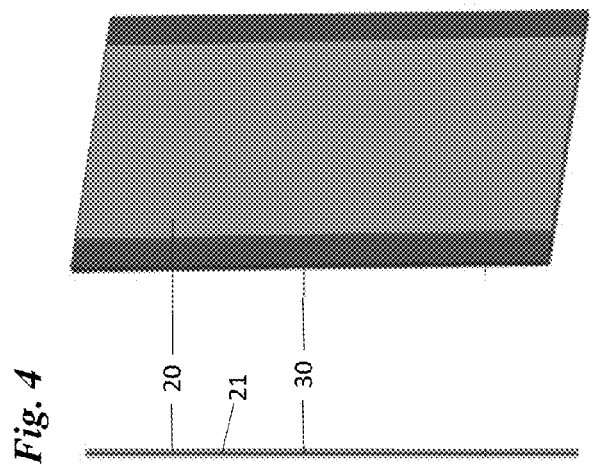
FIG. 4 is a side elevation view of the protective device of FIG. 2.
Figure 3:
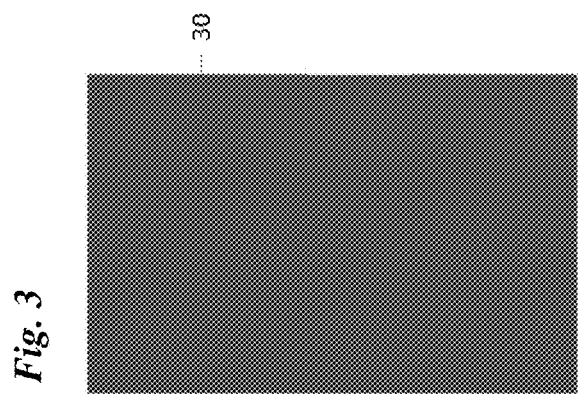
FIG. 3 is a rear elevation view of the protective device of FIG. 2.
Figure 2:
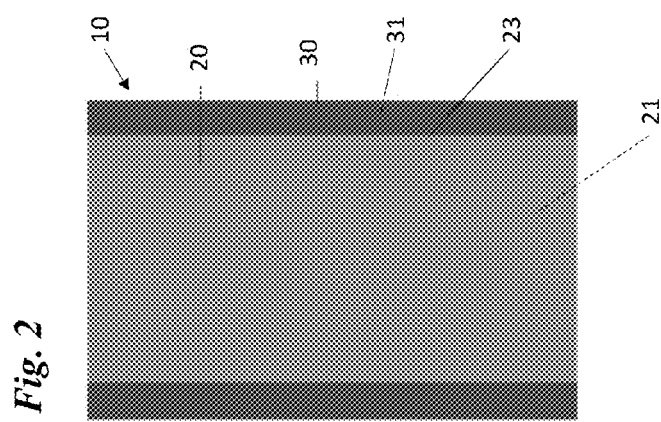
FIG. 2 is a front elevation view of a preferred embodiment of a protective device made according to this invention. A first (outer) layer of the device has a different rigidity and coefficient of friction than the second (inner) layer. "Belt loops" or handles with magnets attached could be added to the device to accommodate or receive a rigging line (see FIGS. 8 & 9).
Figure 5C:
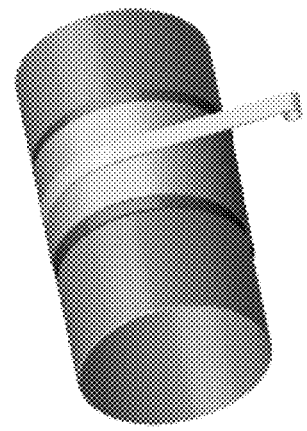
FIG. 5C is the protective device of FIG. 5A wrapped about the object and secured with cargo straps in a manner similar to how the object would be secured to and transported by a flatbed trailer.
Figure 5B:
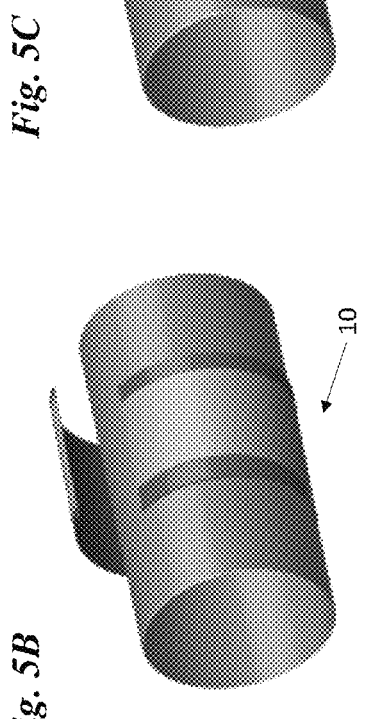
FIG. 5B is the protective device of FIG. 5A as it is wrapped about the object.
Figure 5A:
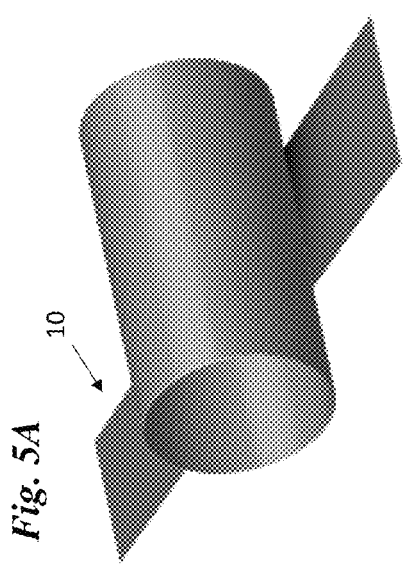
FIG. 5A is an isometric view of a coated object being placed onto a preferred embodiment of the protective device.
Figure 7:
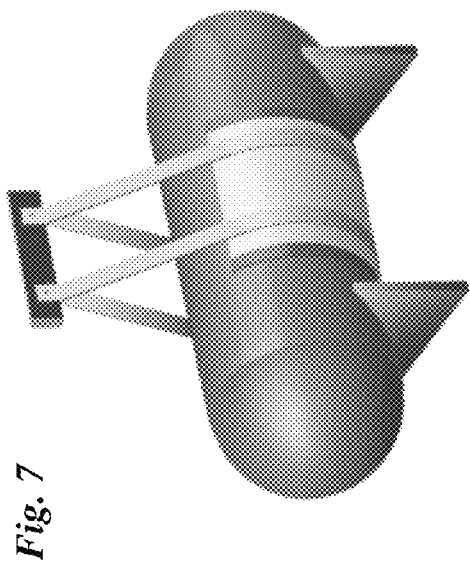
FIG. 7 is the protective device of FIG. 6A as it would be used during transport of the vessel by the flatbed trailer.
Figure 6:
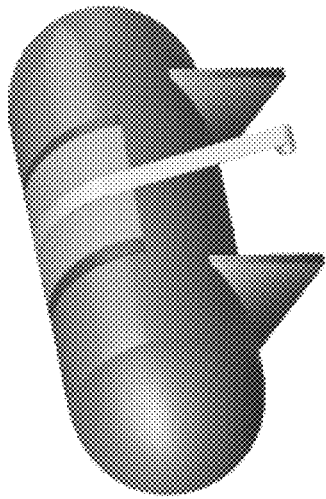
FIG. 6 is a preferred embodiment of the protective device as it would be used to lift a vessel onto a flatbed trailer for transportation. When used as a lifting device, the coating is preferably at least dry-to-handle and protective device preferably includes magnetic strips placed along the upper face surface of the inner layer not covered by the outer layer.
Figure 8:
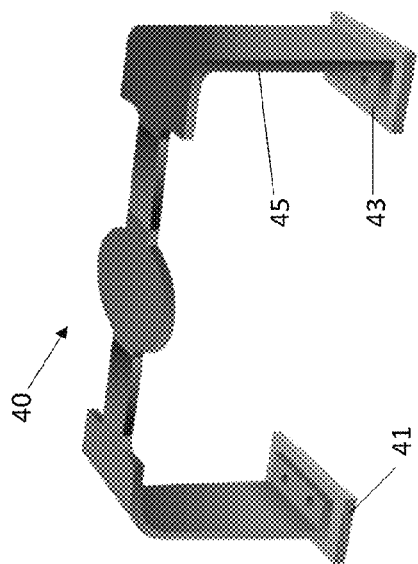
FIG. 8 is a preferred embodiment of a handle or belt loop that can be connected to the protective device to assist in handling and positioning the device on the object to be protected.
Figure 9:
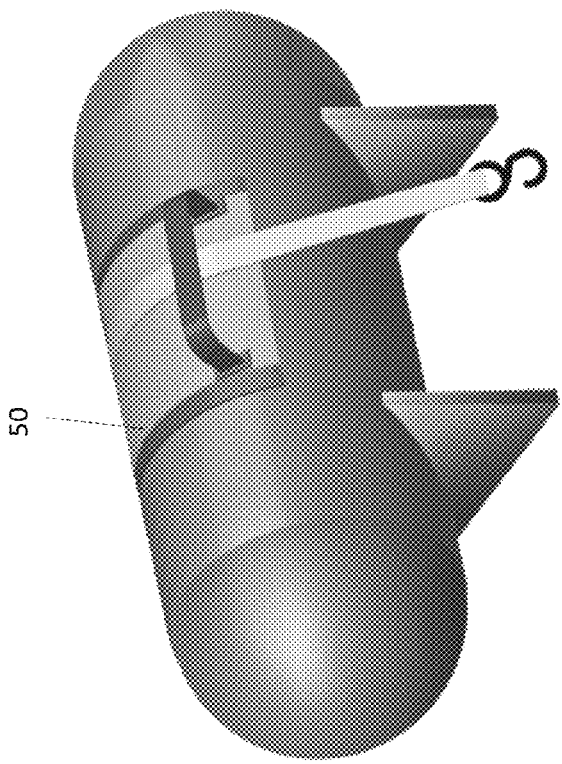
FIG. 9 is the handle or loop of FIG. 8 when connected to the protective device.

10 Protective device or strap
20 Outer or outermost layer
21 Lower face surface
23 Longitudinal edge
30 Inner or innermost layer
31 Upper face surface
40 Handle or belt loop
41 Magnets
43 End
45 Legs
50 Magnetic strip

DEFINITIONS

For the purpose of this disclosure, the following terms have the following meanings:

Coefficient of friction—ratio between the force need to start or maintain uniform relative motion between two surfaces when in contact with one another.

Cured coating—the coating or paint is 100% dry (past the dry-to-handle time with all solvents present having evaporated) and has reached its maximum hardness, or is the coating manufacturer's cure time Dry coatings—solvents present in the coating or paint have evaporated to the point such that the coating is:

Dry-to-touch—the coating satisfies the requirements of ASTM-D1640 §7.5, which is hereby incorporated by reference, or the coating manufacturer's dry-to-touch time; or Dry-to-hard—the coating satisfies the requirements of ASTM-D1640 §7.6, which is hereby incorporated by reference, or the coating manufacturer's dry-to-hard time; or Dry-through or dry-to-handle—the coating satisfies the requirements of ASTM-ASTM-D1640 §7.7, which is hereby incorporated by reference, or the coating manufacturer's recommended dry-to-handle time; or Dry-to-recoat—the coating satisfies the requirements of ASTM-ASTM-D1640 §7.8, which is hereby incorporated by reference, or the coating manufacturer's recommended dry-to-recoat time.

Flexibility (pliability)—complementary to stiffness. The more flexible the material, the less stiff it is.

Hardness—a measure of how resistant a material is to permanent shape change when a compressive force is applied to it.

Rigging line—a strap, cable, chain, chord, tether or the like usually having ends connected to opposing tie-down or lift points and used to lift, move or secure a load.

Rollability—a measure of how tight a material can be placed onto a roll and, when unrolled, not deform or twist itself or another different material that it overlaps with on the roll.

Self-center or self-centering—the tendency of a rigging line to move relative to a straight line defined by its tie-down or lift points before coming to a final at-rest position as the object is first being lifted by the rigging line or as the rigging line is being tightened about the object.

Stiffness—a measure of how resistant a material is to deflection when a force is applied to the material.

Stretching—the tendency of a rigging line to extend lengthwise when being tightened or when under load; stretching can occur during self-centering and can continue after self-centering.

DETAILED DESCRIPTION OF THE PREFERRED EMBODIMENTS

Referring to FIGS. 2 to 9, a preferred embodiment of a protective device 10 is constructed using a rigid or semi-rigid, flexible material as a first (outermost) layer 20 and a semi-soft flexible material optionally coated or infused with a non-stick substance as a second (innermost) layer 30. The device 10 is sized so that covers at least a portion of a coated object's surface that would normally come into contact with a rigging line. The protective device 10 when in use sits between that surface and rigging line and distributes the load of the line when in tension so that no telegraphing of the line occurs on the coated surface.

The outer layer 30 has a different coefficient of friction than the inner layer 30 such that a rigging line when being tightened about the device can self-center over the outer layer 20 of the device 10 while at the same time the inner layer 30 prevents the device from moving longitudinally or laterally over the painted or coated substrate of the object. Preferably, the outer layer 20 does not compress when under load but the inner layer 30 does compress under load (e.g. 64 mils to 40 mils).

The outer and inner layers 20, 30 are preferably connected or bonded to one another so the layers of the protective device 10 consists of only these two layers 20, 30, with an upper face surface 31 of the inner layer 30 bonded to an opposing lower face surface 21 of the outer layer 30. Alternatively, although not preferred, each layer 20, 30 could be separate piece and used in combination as a two-piece protective device 10.

In applications where an object having a coated surface is to be handled, the lower face surface 31 of the inner layer 30 can be coated or infused with a non-stick material to ensure little to no damage to the coated substrate even when the coating is in a range of dry-to-touch to dry-to-handle state (or in a range of dry-to-touch but not yet dry-to-handle state). This feature allows a manufacturing facility to move, stack, or ship delicate or freshly painted items much more quickly than can be done currently with little or no damage to the surface. Preferably, the lower face surface 31 of the inner layer 30 is a microcrystalline-infused non-stick surface.

The outer layer 20 can be an aluminum sheet or its equivalent or can be a spray-on polyurethane or polyuria coating or its equivalent. The polyurethane or polyuria coating can include a dry film lubricant such as but not limited to graphite or graphene oxide or molybdenum disulfide ("moly") or some combination of graphite or graphene oxide and moly. The inner layer 30 can be a rubber cellulose (gasket) material or its equivalent.

A handle or belt loop 40 can be temporarily connected to the protective device 10 to assist a user in handling and positioning the device 10. The handle 40 preferably includes a pair of magnets 41 at the end 43 of each leg 45. A magnetic strip 50, running toward and parallel to the longitudinal edges 23 of the outer layer 20, can placed between the inner and outer layers 20, 30. If the outer layer 20 is a magnetic material, the magnetic strip 50 can be eliminated.

In addition to compression (hardness), rigidity (stiffness) or flexibility (pliability), and coefficient of friction, another key consideration in selecting the materials for the inner and outer layers 20, 30 of the protective device 10 is the rollability of the inner layer 30 and outer layer 20 materials, especially relative to one another. Ideally, the two materials should be selected so that a predetermined length L can rolled into a donut shape having a predetermined inner radius R and then unrolled without any twisting of the protective device 10.

By way of a non-limiting example, a prototype of the protective device made for testing purposes was 8 inches wide by 48 inches long (20.32 cm×121.92 cm) with the outer layer being 0.012 gauge aluminum and the inner layer being a ¾4-inch thick (1.1906 mm) rubber cellulose gasket material measuring approximately 10 inches wide by 52 inches long (25.4 cm×132.08 cm) and having one face surface treated with a wax coating.

In embodiments that apply or infuse a non-stick material to the inner layer, the non-stick material should be designed to retain its physical properties and non-stick characteristics in an expected temperature range for the application or, alternatively, in temperature range between −75° F. to 175° F. (−59.44° C. to 79.44° C.). In direct sunlight, some substrates (especially dark colors) can achieve a surface temperature of about 170° F. (76.67° C.) and an already soft coating like a silicone/silicone acrylic thermoplastic coating can become even softer.

In a test conducted by the inventors, a 300-gallon (1135.62 liter) previously painted propane tank was prepared for paint using an orbital sander with 80 grit sandpaper. Because the test was designed to be a "worst case" scenario, the coating system applied was one of the softest, most thermoplastic, and problematic known and only marginal surface preparation of SSPC-SP2/3 (hand tool cleaning steel surfaces) was employed instead of the typical SSPC-SP10 (near white metal sand blast) 1-2 mil profile. All surface preparation and coating application was witnessed by a Certified NACE International Level 3 coating inspector.

A prime coat of a single component, inert, multi-polymeric matrix coating was applied using conventional spray equipment at 5-6 mils dry film thickness ("DFT"). This coating was allowed to dry for 24 hours and a finish coat of a silicone hybrid coating was applied using conventional spray equipment at 1.5-2.0 mils DFT.

A cargo strap was secured over the paint surface approximately 30 hours after the finish coat was applied just as would be typical in a fabrication shop yet much less time for the paint to harden. (The 30-hour dry time is approximately half the recommended coating manufacturer's dry-to-handle time.) When the strap was removed the texture of the strap could clearly be seen in the paint surface and could be felt in the soft paint (see FIG. 1). Such damage would have to undergo costly repairs to become aesthetically pleasing to someone purchasing a "new" piece of equipment.

The prototype of the protective device was then placed over the propane tank across an area of contact between the tank and the cargo strap. The strap was secured to a flatbed trailer just as would be typical, with the strap being secured to the approximate same tension as was in the test without the protective device. The trailer was then hooked onto a truck and driven approximately 35 miles on poorly maintained roads to ensure a rough ride. When the strap was removed and the protective device lifted from the tank, no damage, markings, or impression in the coating was observed. Using a POSITECTOR® 6000 type 2 electromagnetic gauge (DeFelsko Corp., Ogdensburg, N.Y.) and following the SSPC-PA2 procedure for checking DFT, no impression or compression of the coating system could be detected. These tests were conducted by a NACE Certified Level 3 coating inspector.

A method of protecting a coated object during transport includes the step of placing the protective device 10 between a rigging line and a coated outer face surface portion of the coated object. The coating can be dry-to-touch, dry-to-hard, dry-to-handle, or dry-to-recoat.

The scope of the invention is defined by the following claims and the full range of equivalents to which the recited elements are entitled.

What is claimed:

1. A method of protecting a coated object during transport, the method comprising:
   placing a protective device between a rigging line and a coated portion of the coated object, the protective device comprising a strap including:
      an outermost layer having a first rigidity and a first coefficient of friction, the first coefficient of friction selected to permit a rigging line to self-center between two points when the rigging line is in contact with the outermost layer and under tension; and
      an innermost layer having a second rigidity that is lower than the first rigidity and a second coefficient of friction that is different from the first coefficient of friction, the second coefficient of friction selected to prevent movement of the protective device relative to the coated object as the rigging line self-centers,
      wherein the outermost and innermost layers of the strap are bonded to one another.

2. A method according to claim 1 wherein the outermost layer is a metallic material and the innermost layer is a non-metallic material.

3. A method according to claim 1 wherein the innermost and outermost layers are a non-metallic material.

4. A method according to claim 1 wherein the outermost layer partially overlapping the innermost layer.

5. A method according to claim 1 wherein the innermost layer includes a face surface coated with a non-stick material.

6. A method according to claim 1 wherein the innermost layer is infused with a non-stick material.

7. A method according to claim 1 further comprising the placing step including the using a handle connected to the outermost layer.

8. A method according to claim 7 wherein the handle is a loop.

9. A method according to claim 7 further comprising at least one of attaching and removing the handle, wherein the handle is temporarily attached to the outermost layer.

10. A method according to claim 1 wherein the coated portion is dry-to-touch.

11. A method according to claim 1 wherein the coated portion is dry-to-hard.

12. A method according to claim 1 wherein the coated portion is dry-to-handle.

13. A method according to claim 1 wherein the coated portion is dry-to-recoat.

* * * * *